(12) United States Patent
Praden et al.

(10) Patent No.: US 10,565,356 B2
(45) Date of Patent: Feb. 18, 2020

(54) METHOD, PRINTING DEVICE AND SYSTEM FOR PRINTING A THREE DIMENSIONAL OBJECT

(71) Applicant: GEMALTO SA, Meudon (FR)

(72) Inventors: Anne-Marie Praden, Gemenos (FR); Jean-Philippe Millard, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/769,545

(22) PCT Filed: Oct. 20, 2016

(86) PCT No.: PCT/EP2016/075290
§ 371 (c)(1),
(2) Date: Apr. 19, 2018

(87) PCT Pub. No.: WO2017/072027
PCT Pub. Date: May 4, 2017

(65) Prior Publication Data
US 2018/0307813 A1    Oct. 25, 2018

(30) Foreign Application Priority Data
Oct. 29, 2015 (EP) .................................. 15306727

(51) Int. Cl.
*G06F 7/04* (2006.01)
*G06F 17/30* (2006.01)
(Continued)

(52) U.S. Cl.
CPC .......... *G06F 21/123* (2013.01); *G06F 3/1222* (2013.01); *G06F 3/1239* (2013.01);
(Continued)

(58) Field of Classification Search
CPC ......... G06T 17/00; G06T 17/20; B33Y 50/02; B33Y 10/00; B33Y 30/00; G06F 3/1238;
(Continued)

(56) References Cited

U.S. PATENT DOCUMENTS 8,847,953 B1 * 9/2014 Cho .................... B29C 67/0051
345/419
10,052,822 B1 * 8/2018 Sait ..................... B29C 67/0088
(Continued)

OTHER PUBLICATIONS

International Search Report (PCT/ISA/210) dated Dec. 5, 2016, by the European Patent Office as the International Searching Authority for International Application No. PCT/EP2016/075290.
(Continued)

*Primary Examiner* — Trong H Nguyen
(74) *Attorney, Agent, or Firm* — Buchanan Ingersoll & Rooney PC (57) ABSTRACT

A method, a device and a system for printing a three dimensional object are disclosed. A printing device, as a first device, or a second device stores predetermined data relating to one or several printings. The second device cooperates with the first device. The first or the second device stores a predetermined printing threshold. The first or the second device determines and stores, during a printing of the three dimensional object, at least one current printing progress rate. The first or the second device compares the current printing progress rate to the predetermined printing threshold. As soon as the current printing progress rate is greater than or equal to the predetermined printing threshold, the first or the second device updates the data relating to one or several printings, so as to validate the printing of the three dimensional object.

10 Claims, 2 Drawing Sheets

(51) Int. Cl.
  *G06F 21/12* (2013.01)
  *G06F 3/12* (2006.01)
  *G06F 21/60* (2013.01)
  *B33Y 30/00* (2015.01)
  *B33Y 50/02* (2015.01)

(52) U.S. Cl.
  CPC .......... *G06F 3/1273* (2013.01); *G06F 21/608* (2013.01); *B33Y 30/00* (2014.12); *B33Y 50/02* (2014.12); *G06F 2221/0775* (2013.01)

(58) Field of Classification Search
  CPC .... G06F 21/608; G06F 3/1239; G06F 3/1259; G06F 3/1258; G06F 21/123; G06F 3/1273; G06F 3/1222; G06F 2221/0775; G06F 21/121; G06F 21/10
  See application file for complete search history.

(56) References Cited

U.S. PATENT DOCUMENTS

| | | | |
|---|---|---|---|
| 2003/0084809 A1* | 5/2003 | Goh | G06Q 20/382 101/484 |
| 2004/0207662 A1* | 10/2004 | Anderson | G06T 17/20 715/772 |
| 2008/0148067 A1 | 6/2008 | Sitrick et al. | |
| 2009/0165147 A1 | 6/2009 | Jung et al. | |
| 2015/0253761 A1* | 9/2015 | Nelson | G06F 17/50 700/98 |

OTHER PUBLICATIONS

Written Opinion (PCT/ISA/237) dated Dec. 5, 2016, by the European Patent Office as the International Searching Authority for International Application No. PCT/EP2016/075290.

* cited by examiner

METHOD, PRINTING DEVICE AND SYSTEM FOR PRINTING A THREE DIMENSIONAL OBJECT

FIELD OF THE INVENTION

The invention relates generally to a method for printing a three Dimensional (or 3D) object.

Furthermore, the invention pertains to a device for printing a 3D object.

Lastly, the invention concerns a system for printing a 3D object as well.

The present invention is notably applicable to a 3D printing (or termed additive manufacturing) field wherein a chip may be embedded within or removable from a 3D printer, as a Secure Element (or SE) host device. The chip may be included within a smart card, a Universal Serial Bus (or USB) or the like, as an SE medium that is removable from the 3D printer.

Within the present description, an SE (also termed token) is a smart device that includes a chip that protects access to stored data and is intended to communicate data with the outside world, like e.g. a 3D printer, as an SE host-device.

STATE OF THE ART

US 2015/0253761 A1 discloses a technique for controlling printing items based on a token(s). A 3D printer identifies to a control system and provides the control system with the token(s). Once the 3D printer is successfully identified and the token(s) is(are) validated, the control system provides the 3D printer with a decryption key to be used for decrypting an encrypted file to print the concerned file for a limited allowed number of items. Once successfully (or not) printed, the 3D printer informs the control system about the print success (or failure). When printed, the control system updates a database.

When printing, a 3D printer may be intentionally interrupted while a corresponding 3D printed object is not completely achieved. A part of the complete 3D printed object, like e.g. a statuette with a base, is missing, such as e.g. the base of the statuette. A resulting partly 3D printed object; may be sufficiently built to be functionally or aesthetically usable (and therefore saleable).

However; despite getting a usable 3D printed object the 3D printer considers that the 3D printing process is not terminated and allows re-printing a 3D object as if no 3D printed object has been built. Thus, a fraudster interrupts a 3D printing process, so as to re-launch another 3D printing process as many times as desired and to get usable 3D printed objects without paying all the resulting 3D printed objects.

There is therefore a need to avoid allowing a fraudulent re-printing of one or several 3D objects when a corresponding 3D printing process allows getting a 3D printing object that is valid.

SUMMARY OF THE INVENTION

The invention proposes a solution for satisfying the just hereinabove specified need by providing a method for printing a three dimensional (or 3D) object.

According to the invention, a printing device, as a first device, or a second device stores predetermined data relating to one or several printings. The second device cooperates with the first device. The first or the second device stores a predetermined printing threshold. The method comprises the following steps. The first or the second device determines and stores, during a printing of the three dimensional object, at least one current printing progress rate. The first or the second device compares the current printing progress rate to the printing threshold. As soon as the current printing progress rate is greater than or equal to the printing threshold, the first or the second device updates the data relating to one or several printings.

The principle of the invention consists in that a (3D) printing device or a cooperating device monitors a (3D) printing progress and, when a predetermined (3D) printing threshold is reached, the printing or cooperating device modifies or updates predetermined (3D) data relating to one or several printings, such as a printing number, a printing status or the like, also termed printing data.

In other words, when a printing process is launched, a printing progress rate is controlled with respect to the printing threshold and, once this latter is reached, the printing or cooperating device considers that the already 3D printed object is terminated.

It is noteworthy that there is no constraint as to the way an update of the printing data is achieved. It may be e.g. by incrementing or decrementing by one or several units a counter or changing a printing status to a predefined status value relating to a 3D printed object.

Thus, as soon as the printing threshold is reached, the printing or cooperating device validates a corresponding (3D) printing and no other undue 3D object printing is therefore rendered possible.

It is to he noted that the printing threshold does not have any constraint and may be configured according to e.g. a 3D object to be printed. The printing threshold may be defined, so as to ensure a printing of the functional and/or aesthetical part of the 3D object to be printed. For instance, a statuette with a base is considered printed as soon as the body of the statuette is achieved without having begun a printing of the base.

Contrary to the herein above described known solution, the invention solution based on a printing progress monitoring with respect to a predefined printing threshold is more secure than the known solution. Thus, a hacker is not able to benefit from any other undue 3D printed object while interrupting a 3D printing process that reaches at least the predefined printing threshold without validating such a printing, i.e. considering that the printing process on progress is completed or terminated.

The invention solution allows securing a 3D printing process by validating a 3D printing once a printing threshold is achieved.

The invention solution is automatically implemented. Thus, an issuer of a 3D object or a corresponding 3D object printing file is not involved to monitor a 3D printing progress.

The invention method is therefore convenient for a concerned issuer or operator or on its behalf.

According to an additional aspect, the invention is a printing device for printing a 3D object.

According to the invention, the printing device, as a first device, comprises means for storing a predetermined data relating to one or several printings. The first device comprises means for storing a predetermined printing threshold. The first device is configured to determine and store, during a printing of the three dimensional object, at least one current printing progress rate. The first device is configured to compare the current printing progress rate to the printing threshold. The first device is configured to update, as soon as the current printing progress rate is greater than or equal to the printing threshold, the data relating to one or several printings.

According to still an additional aspect, the invention is a system for printing a 3D object.

According to the invention, the system comprises a printing device, as a first device, and a second device. The second device comprises means for cooperating with the first device. The first or the second device comprises means for storing predetermined data relating to one or several printings. The first or the second device comprises means for storing a predetermined printing threshold. The first or the second device is configured to determine and store, during a printing of the three dimensional object, at least one current printing progress rate. The first or the second device is configured to compare the current printing progress rate so the printing threshold. The first or the second device is configured to update, as soon as the current printing progress rate is greater than or equal to the printing threshold, the data relating to one or several printings.

As a second device, it may include an SE, like e.g. an embedded chip or a chip removable from the printing device.

The invention does not impose any constraint as to a kind of the SE type.

As a removable SE, it may be a Secure Removable Module (or SRM), a smart dongle of the USB type, a (micro-)Secure Digital (or SD) type card or a Multi-Media type Card (or MMC) or any format card to be coupled or connected to a printing device, as a chip host device.

Instead of an SE, it may be another device with data processing means, data storing means and one or several Input/Output (or I/O) interfaces, like e.g. a computer device.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

Herein under is considered a case in which the invention method for printing a 3D object is implemented by a 3D printer, as a first device and an SE host device, and a chip carried by a card, as a second device and an SE medium.

Alternately, instead of being carried by a card, the chip may be an embedded chip, as a chip soldered, possibly in a removable manner, on a Printed Circuit Board (or PCB) of a 3D printer, or a Trusted Execution Environment (or TEE), as an SE, a secure area of a 3D printer (micro)processor and a secured runtime environment.

The SE (or token) may have different form factors.

Instead of being carried by a card, the chip may be carried by another medium, such as a dongle, like e.g. a USB type dongle.

According to another embodiment (not represented), the invention method for printing a 3D object is implemented by a 3D printer, as a standalone entity, at a client side. In other words, the 3D printer does not cooperate locally with any device, like an SE, so as to secure a validation of a 3D printing when a 3D object is being printed and the 3D printing process reaches a predetermined printing threshold. According to such an embodiment (not represented), the 3D printer is adapted to carry out the functions that are described infra and that are exerted by the SE and the 3D printer. A 3D printer may thus support an invention printing monitoring application that is stored in a non-trusted environment (instead of a trusted environment by using an SE).

Naturally, the herein below described embodiment is only for exemplifying purposes and is not considered to reduce the scope of the present invention.

Figure 1:
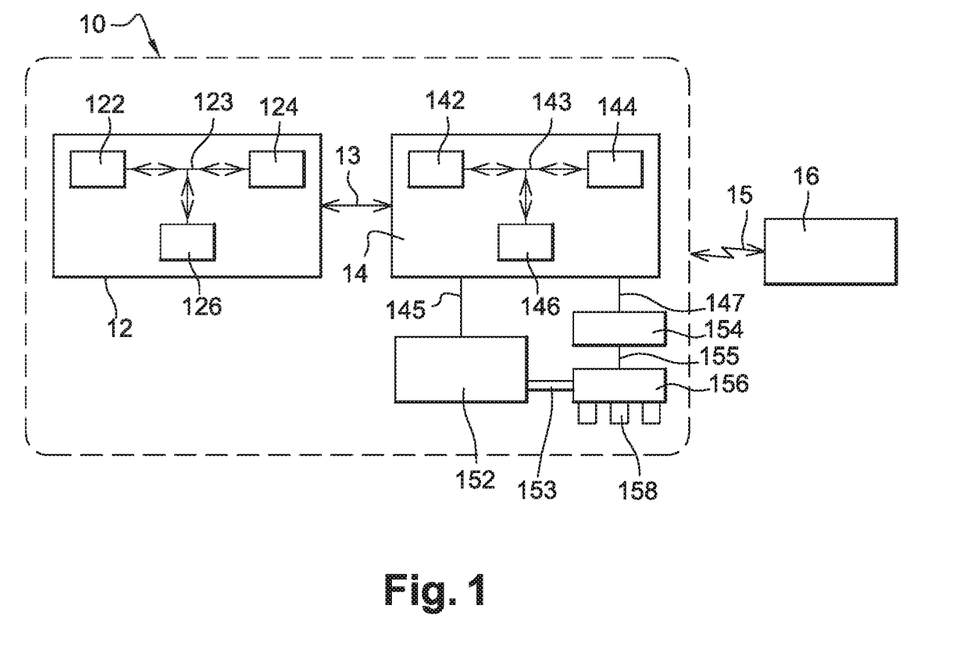
FIG. 1 is a simplified diagram of an exemplary embodiment of a 3D printing equipment with a 3D printer and an SE, the 3D printing equipment being connected to a remote server and arranged to monitor a 3D printing process and to validate a 3D printing as soon as a predetermined 3D printing threshold is reached by updating stored data relating to one or several printings, according to the invention.

FIG. 1 shows schematically a 3D printing equipment 10 that is preferably connected to a remote server 16.

The 3D printing equipment 10, as a system for printing a 3D object, comprises a chip 12 and a 3D printer 14.

For the sake of simplicity, the chip 12, the 3D printer 14 and the remote server 18 are termed herein after the SE 12, the printer 14 and the server 16 respectively.

The SE 12 is under a control of the printer 14.

The SE 12 is preferably associated with or tied to the server 18.

The SE 12 belongs preferably to a user of the printer 14, as a subscriber to an operator of the server 18, so as to benefit from one or several 3D printing services.

The SE 12 includes a (micro)processor(s) 122, as data processing means, a memory(ies) 124, as data storing means, and one or several Input/Output (or I/O) interfaces 128 that are internally all connected, through an internal bidirectional data bus 123, to each other.

The SE I/O interface(s) 126 allow(s) communicating data from the internal SE 12 components to the chip exterior and conversely.

The SE 12 is connected or coupled, through a contact or contact-less link 13, to the printer 14.

The SE 12 is able to cooperate with the printer 14.

The SE I/O interface(s) with the printer 14 may be a USB, a (micro)SD and/or MMC type interface(s), as a contact interface(s), when the SE 12 is inserted, in a removable manner, in the printer 14.

Alternately, instead of a contact interface(s), the SE I/O interface with the printer 14 is connected to or includes a contact-less interface. The SE 12 is connected to or includes means for communicating data while using preferably a Short Range (or SR) RadioFrequency (or RF) link(s). The SR RF link(s) may be related to any technology that allows the SE 12 to exchange data, through a contact-less link(s), with the printer 14. The SR RF may be related to a Bluetooth (registered Trademark), WiFi (registered Trademark) and/or a Near Field Communication (or NFC) type technology(ies), as a contact-less technology(ies).

The processor 122 processes, controls and communicates internally data with ail the other components incorporated within the SE 12 and, through the I/O interface(s) 128, with the SE exterior.

The processor 122 executes or runs-one or several applications.

The processor 122 performs, in a preferred manner, one or several security functions.

The security functions include preferably a user authentication process to be used prior to accessing the memory 124, notably at a boot and/or a re-boot of the SE 12. To authenticate the user, the user has to provide a Personal Identification Number (or PIN) and/or biometric data, as user reference data to be matched that is stored, preferably in a secure manner, in the memory 124. As biometric data, it may include one or several fingerprints, one or several iris prints and/or one or several voiceprints relating to one or several authorized users.

The security functions include preferentially a ciphering/deciphering process to be used before sending data to outside/after receiving data from outside, so as to protect access to data managed by the SE 12. To cipher data to be sent, the SE 12 uses a ciphering key and a ciphering algorithm, like e.g. an Advanced Encryption Standard (or (AES), a Data Encryption Standard (or DES), that are stored within the memory 124. To decipher data to be received, the SE 12 may use a deciphering key and a deciphering algorithm, like e.g. an AES, a DES or the like, that are stored within the memory 124.

The security functions include preferentially a data signature process to be used before sending data, like a transaction response, to outside, so as to prove an origin of data originating from the SE 12. To sign data, the SE 12 uses a predetermined signature algorithm and a predetermined signature key that are both stored within the memory 124. The signature key is preferably related to the SE 12, as private key. The interlocutor device, namely the server 16 or the printer 14, verifies corresponding signed data by using a predetermined signature verification algorithm and a predetermined signature verification key that are both stored within the interlocutor memory. The signature verification key is preferably a public key relating to the SE 12 that has been deduced from the SE private key. According to one embodiment, the signature key and the signature verification key constitute one and the same key, as a key shared between the SE 12 and its interlocutor device(s), namely the server 18 and possibly the printer 14.

The security functions include preferably a device authentication process to be used prior to exchanging with the device, like e.g. at a boot and/or a re-boot of the SE 12. To authenticate the device, like e.g. the printer 14 or the server 18, the device has e.g. an authentication algorithm and a secret(s) shared between the device and the SE 12 and has to provide a response that is dependent on a challenge previously provided by the BE 12 to the device. The SE 12 determines an expected response by using the provided challenge, the shared authentication algorithm and secret(s). The SE 12 compares a received response to the expected response. Only if the received response matches the expected response, then the SE 12 authenticates successfully the device. Any other authentication process may be used.

The processor 122 is preferably able to initiate actions, in order to interact directly with the outside world, in an independent manner of the printer 14, as ah SE host device. Such a capacity of interaction at the initiative of the SE 12 is also known as being a proactive capacity.

The memory 124 stores preferably an identifier relating to the SE 12. The SE 12 is able to identify to any interlocutor device.

The memory 124 stores preferably one or several keys. The key may include preferably an SE authentication key, a ciphering key, a deciphering key and/or a signature key. The SE authentication key is used for authenticating the SE 12 to any interlocutor device. The ciphering key is used for ciphering data to be sent, in order to protect access to the concerned data. The deciphering key is used for deciphering ciphered data, so as to access data in plain text. The signature key is used for signing data to be sent, so as to prove that a sender of the concerned data is the SE 12.

The memory 124 stores preferably data relating to a Uniform Resource Identifier (or URI), such as a Uniform Resource Locator (or URL), an Internet Protocol (or IP) address and/or the like, as an identifier(s) relating to the server 16.

According to an essential feature of the invention, the memory 124 stores a predetermined printing threshold.

Alternately, instead of the SE 12, the printer 14 stores a predetermined printing threshold.

The printing threshold may have been previously downloaded from a remote server after an SE 12 issuance.

The printing threshold is reference data which one or several printing progress rates are to be compared to.

According to the invention, the memory 124 stores predetermined data relating to one or several printings, like e.g. printing number, a printing status and/or the like, as printing data.

Alternately, instead of the SE 12, the printer 14 stores predetermined printing data.

The printing data may have been previously either loaded during a manufacturing process at a personalization of the SE 12 or downloaded from a remote server after an SE 12 issuance.

The printing data relates preferably to a particular 3D object to be printed one or several times.

The memory 124 stores an Operating System (or OS) and one or several applications.

Among the supported applications, the memory 124 stores an invention 3D printing monitoring application that the processor 122 executes.

Alternately, instead of the SE 12, the printer 14 supports an invention 3D printing monitoring application.

The SE 12 (or the printer 14) is arranged to detect or determine and store, during a printing of the 3D object, one or several current printing progress rates.

The SE 12 (or the printer 14) is adapted to compare a determined current printing progress rate to the printing threshold.

According to an essential feature of the invention, the SE 12 (or the printer 14) is configured to update, as soon as the current printing progress rate is greater than or equal to the printing threshold, the predetermined data relating to one or several printings. Such a printing data update allows to validate a corresponding printing.

To validate corresponding printing data, the SE 12 (or the printer 14) increments or decrements, by one or several units, a counter relating to a printing number, as if a resulting 3D object is (completely) printed.

Alternately or additionally, to validate corresponding printing data, the SE 12 (or the printer 14) modifies a printing status by setting the printing status to a predefined printing status value that relates to a consumption of a printing right, i.e. a 3D printing is considered achieved.

Optionally, the SE 12 (or the printer 14) stores data relating to one or several printing interruptions, like e.g. a printing interruption counter, that is previously initialized or set to a predefined value, like e.g. zero, and stores a predetermined printing interruption threshold. The SE 12 (or the printer 14) is configured to update, if the printing of the 3D object is interrupted or stopped and a last current printing progress rate is less than the printing threshold, the printing interruption data. To update the printing interruption data, the SE 12 may increment or decrement, by one or several units, the interruption counter. The SE 12 (or the printer 14) stores preferably, in an associated manner with the (updated) printing interruption data, the last current printing progress rate. The SE 12 is arranged to compare the printing interruption data to the printing interruption threshold. The SE 12 is adapted to send, as soon as the printing interruption data matches the printing interruption threshold, to a remote server an alert message.

The printer 14, as an SE host device, is coupled or connected to the SE 12, so as to cooperate with the SE 12, so as to validate (or not), during a 3D printing, a corresponding 3D printing by updating data relating to a printing, such as the printing number or a printing status.

Alternately, the printer 14 comprises the SE 12 that is soldered or fixed, possibly in a removable manner, to the PCB of the printer 14.

The printer 14 includes one or several (micro)processors 142, as data processing means, one or several memories 144, as data storing means, and one or several I/O interfaces 146 that are linked all together through a control and data bus 143.

The printer 14 includes preferably a display screen (not represented) and a keyboard (not represented), as a printer Man Machine Interface (or MMI).

Alternatively, instead of a physical keyboard separated from the display screen, the printer 14 is equipped with a touch sensitive display screen, as a virtual keyboard.

The printer MMI allows a printer user to interact with the printer 14.

The printer 14 includes or is connected, through a first contact or contact-less link 145, to one or several containers 152. Each container 152 contains a material to be used to print a 3D object.

The printer 14 includes or is connected, through a second contact or contact-less link 147, to a positioning module 154.

The positioning module 154 is connected, through a third contact or contact-less link 155, to one or several printing heads 156.

The printing head(s) 156 is(are) connected, over one or several pipes 153, to the containers) 152. The pipes 153 allow to conduct one or several materials from the containers 152 to the printing head(s) 156.

The positioning module 154 is used to move the printing head(s) 156 to a desired position in which one or several materials are extruded from the printing head(s) 156 to print or build a 3D object.

Other printer configuration is also possible.

A printer memory stores an identifier relating to the printer 14.

The printer memory(ies) 144 store(s) an OS and one or several applications.

The processor 142 performs, in a preferred manner, one or several security functions.

The security functions include preferably a device authentication function to be used prior to exchanging with the device, like e.g. at a boot and/or a re-boot of the printer 14. To authenticate the device, like e.g. the SE 12 or the server 16, the device has e.g. an authentication algorithm and a secret(s) shared between the device and the printer 14 and has to provide a response that is dependent on a challenge previously provided by the printer 14 to the device. The printer 14 determines an expected response by using the provided challenge, the shared authentication algorithm and secret(s). The printer 14 compares a received response to the expected response. Only if the received response matches the expected response, then the printer 14 authenticates successfully the device. Any other authentication process may be used.

The security functions include preferentially a ciphering/deciphering process to be used before sending data to outside/after receiving data from outside, so as to protect access to data managed by the printer 14. To cipher data to be sent, the printer 14 uses a ciphering key and a ciphering algorithm, like e.g. an AES, a DES, that are stored within the memory 144. To decipher data to be received, the printer 14 may use a deciphering key and a deciphering algorithm, like e.g. an AES, a DES or the like, that are stored within the memory 144.

The printer I/O interfaces include one or several I/O interfaces for exchanging data with the SE 12 and the server 16.

The printer 14 (or the SE 12) is connected, Over The Internet (or OTI) or Over The Air (or OTA) 15, to the server 16.

The server 16 is identified by a URI, like e.g. an URL, and/or an IP type address, as a server identifier(s). The server Identifier(s) is(are) stored within the SE 12 or the printer 14.

The server 16, as an OTA or OTI server, is included within or connected to a mobile network.

The server 16 may be operated by a 3D printing file provider, as a service provider or on its behalf.

The server 16 is hosted by a computer.

A server processor (not represented) performs, in a preferred manner, one or several security functions.

The security functions include preferably a user authentication process to be used prior to accessing a server memory (not represented), notably prior to sending data from the server 16. To authenticate the user, the user has to provide user credentials, like e.g. an on-line PIN, a user name and/or a password, as user reference data to be matched that is stored, preferably in a secure manner, at the server 16 side.

The security functions include preferably a device authentication process to be used prior to exchanging with the server 16. To authenticate the device, like e.g. the SE 12 or the printer 14, the device has e.g. an authentication algorithm and a secret(s) shared between the device and the server 16 and has to provide a response that is dependent on a challenge previously provided by the server 16 to the device. The server 16 determines an expected response by using the provided challenge, the shared authentication algorithm and secret(s). The server 16 compares a received response to the expected response. Only if the received response matches the expected response, then the server 16 authenticates successfully the device. Any other device authentication process may be used.

The security functions include preferentially a ciphering/deciphering process to be used before sending data to outside/after receiving data from outside, so as to protect access to data managed by the server 16. To cipher data to be sent, the server 16 uses a ciphering key and a ciphering algorithm, such as e.g. an AES, a DES or the like, that are stored at the server 16 side. To decipher data to be received, the server 16 may use a deciphering key and a deciphering algorithm, such as e.g. an AES, a DES or the like, that are stored at the server 16 side.

The security functions include preferably a data integrity control process to be used to data after its reception, so as to detect whether received data is or is not modified or altered.

The security functions include preferably an integrity application process to be used to data before its sending, so as to allow a corresponding addressee to detect whether sent data Is or is not modified or altered.

The server 16 includes or accesses a memory (not represented) that stores a database. The server 16 manages the database. The database contains a set of one or several 3D printing files that are preferably, each, associated with a printing threshold.

The server 16 is preferably configured to send to a client device, like e.g. the printer 14, a message including a printing threshold that is associated with a 3D printing file sent or to be sent to the printer 14.

Optionally, the database-further includes, in an associated manner with each 3D printing file, a client device identifier(s) and data relating to a printing, like e.g. a corresponding printing number and/or a corresponding printing status. The printing data is to be updated at the client device side once the printing threshold is reached.

Alternately, Instead of the server 16, another server manages a database that includes a set of client device identifier(s) and corresponding individual data relating to a printing.

The server 16 or another server is preferably arranged to send to a client device, like e.g. the printer 14, a message including data relating to a printing that is associated with a 3D printing file sent or to be sent to the printer 14.

The server 16 may be arranged to receive from a client device a message including a last current printing progress rate. The server 16 may compare the last current printing progress rate to another predetermined printing threshold, so as to verify whether the client device is or is not authorized to be used, since the client device may be suspected to be used by a malicious person or the like.

The server 16 is preferably adapted to send to a client device, like e.g. the printer 14, a message including a command for disallowing or forbidding the client device to print any further 3D object. Such a printing disallowance command may be sent to the client device notably when corresponding printing interruption data reaches a printing interruption threshold. Thus, the concerned client device is not able to further print any 3D object.

Figure 2:
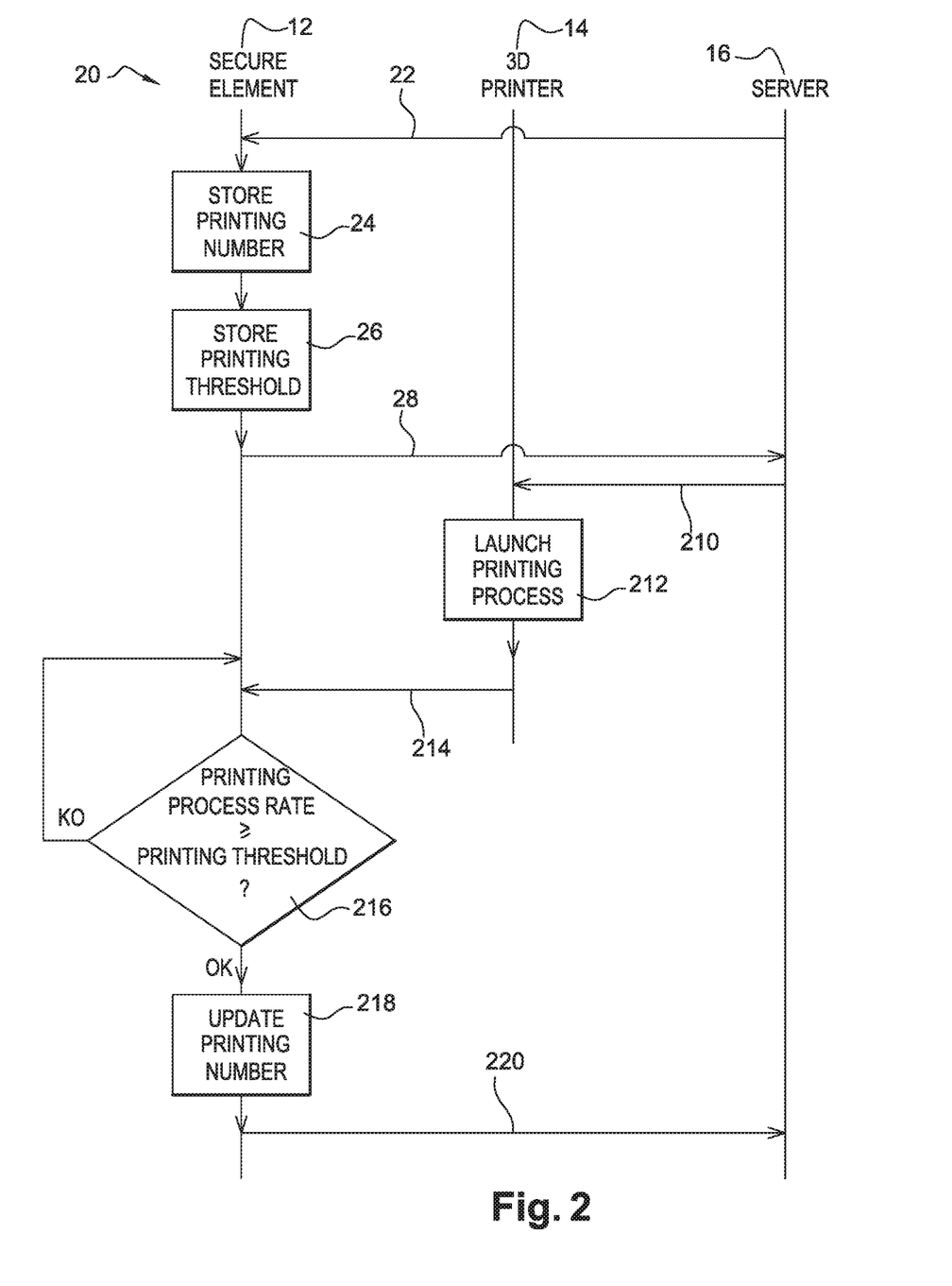
FIG. 2 illustrates an exemplary embodiment of a flow of messages exchanged between the server and the different entities of the 3D printing equipment of FIG. 1, so that an SE is regularly during the 3D printing process informed about a currently detected printing progress rate and the SE updates the printing data once the 3D printing threshold provided by the server to the SE is reached.

FIG. 2 depicts an exemplary embodiment of the invention method 20 for printing a 3D object.

It is assumed that the server 16 manages, for a particular object, like e.g. a statuette with a base, a corresponding 3D printing file, a corresponding printing number, as data relating to one or several printings, a corresponding printing threshold, as predetermined data.

It is further assumed that a user of the printer 14 has paid for only one 3D object printing, as a printing number to be decremented by one unit once a predetermined printing threshold is reached.

The user has preferably authenticated to the SE 12.

The SE 12 has preferably identified and authenticated successfully to the printer 14 and/or the server 16.

The server 16 sends to the SE 12 a message 22 including a predetermined printing number, as data relating to one printing, and a predetermined printing threshold. The printing threshold is adapted to the 3D object to be printed.

The printing number and/or the printing threshold is(are) previously protected in integrity, so as to avoid its(their) modification by a hacker.

Alternately, instead of being included in a single message, the printing number and the printing threshold are included within two separated specific messages.

Thanks to the received message with the printing number and/or the printing threshold to be reached to validate a printing, the SE 12 is dynamically configured and adapted to the 3D object to be printed and may be re-configured and adapted to another 3D object to be printed.

The SE 12 stores 24 the (received) printing number, like e.g. one, as a right to print a single object.

The SE 12 stores 26 the (received) printing threshold, like e.g. 80%, as a printing rate with respect to a complete printing.

Once the printing number and the printing threshold are stored, the SE 12 sends to the server 16 a message 28 including a request for downloading to the printer 14 a 3D printing file possibly accompanied with credentials to be verified by the server 16, like e.g. an electronic token. The credentials have been previously loaded during an SE personalization before its issuance or downloaded from the server 16 or another server after the SE issuance.

The printer 14 has preferably identified and authenticated successfully to the SE 12 and/or the server 16.

After a possible successful verification of the submitted credentials, the server 16 sends to the printer 14 several messages 210 including data relating to a 3D printing file that is preferably previously ciphered.

The printer 14 has previously received a deciphering key (not represented) from the SE 12, the sewer 16 or another server.

Instead of sending the printing threshold in a separated message, one of the messages 210 includes within either metadata or data relating to the 3D printing file.

After a preferable data deciphering, the printer 14 launches 212 a printing process.

During a printing of the 3D object, the SE 12 receives from the printer 14 a message 214 with a current printing progress rate, like e.g. 10% of the complete printing.

The printer 14 may be interrupted during the launched printing process.

Optionally, the SE 12 has previously initialized a printing interruption counter, as data relating to one or several printing interruptions. The SE 12 stores a predetermined printing interruption threshold. At each printing interruption, the printer 14 sends to the SE 12 a message (not represented) including information about an occurrence of a printing interruption including a last current printing progress rate. If the printing of the 3D object is interrupted and the last current printing progress rate is less than the printing threshold, the SE 12 updates the printing interruption data by e.g. incrementing the printing interruption counter by one (or several) unit(s). The SE 12 stores the updated printing interruption data in association with the last current printing progress rate. The SE 12 compares the printing interruption data to the printing interruption threshold. As soon as the printing interruption data matches the printing interruption threshold, the SE 12 sends to the server 16 or another server (not represented) an alert message. The server 16 or another server may follow or track the printer 14, as a potential client device that is used by a malicious person or hacker. The server 16 or another server may send to the printer 14 or the SE 12 a message (not represented) including a command for disallowing the printer 14 to print any further 3D object, notably after a reception of one or several alert messages.

Then, the SE 12 compares 216 the current printing progress rate to the printing threshold.

As long as the current printing progress rate is less than the printing threshold, the SE 12 waits for another printing progress rate informed by the printer 14.

The printer 14 may inform regularly, either each predefined time period or each predefined printing progress sub-threshold, the SE 12 about a current printing progress rate, like e.g. every minute or every 10% of the complete printing.

Otherwise, i.e. as soon as the current printing progress rate is greater than or equal to the printing threshold, the SE 12 updates 218 the printing data by e.g. decrementing the printing number by one (or several) unit(s), so as to validate the printing. In other words, the printing right is consumed or used.

Thus, the user is unable to print again, without using any additional consuming rights, the 3D object as the printing has been considered as completed or achieved.

Optionally, the SE 12 sends to the server 16 a message 220 including an updated printing number that is previously signed in a preferred manner.

The printer 14 may continue the launched printing process of the object until getting a complete printed 3D object even if the SE 12 has validated the printing.

After one or several printings, the printing number reaches at one or several times a value, like e.g. zero, by which the printer 14 is no more allowed to print any further 3D object due to a validation of all the allowed printings.

The invention solution allows validating, in an automatic, quick, secure and efficient manner, a printing allowing thus to avoid a fraudulent re-printing of another 3D object when a corresponding 3D printing allows getting a (usable) 3D printed object.

The invention solution is user friendly since there is no need of any manual intervention at a 3D printing device that implements the invention method.

The invention solution is simple and therefore cheap to implement since only a 3D printing progress is to be monitored.

The invention solution does not need to involve a 3D printer user, except for possibly submitting user authentication data, when applicable, so as to allow a local and/or remote user authentication(s).

The invention solution is therefore transparent to the user, apart from a possible user authentication operation.

The invention solution is preferably secure by authenticating the 3D printer, as a first device, to the SE, as a second device, and possibly a remote server(s), when applicable.

The described embodiment is not intended to limit the scope of the concerned invention. Other embodiments may be given. As another embodiment example, instead of exchanging with a single remote server, the SE and/or the printer exchange(s) with two or more remote servers.

The invention claimed is:

1. A method for printing a three dimensional object, wherein (i) one of a printing device, as a first device, and a secure element, as a second device, stores predetermined data relating to one or several printings, (ii) the second device cooperates with the first device, and (iii) one of the first device and the second device stores a predetermined printing threshold, the predetermined printing threshold being less than a total completion of the printing of the three dimensional object, the method comprising:

detecting and storing, by the first device or the second device, during the printing of the three dimensional object, at least one current printing progress rate relating to the printing of the three dimensional object;

comparing, by the first device or the second device, the detected current printing progress rate to the predetermined printing threshold;

as soon as the detected current printing progress rate is greater than or equal to the predetermined printing threshold, (i) changing, by the first device or the second device, a counter relating to a printing number, or (ii) modifying, by the first device or the second device, a printing status to a predefined printing status value, to indicate that a printing right is consumed, said changing relating to the counter or said modifying relating to the printing status (i) validates the printing of the three dimensional object, and (ii) updates the predetermined data relating to one or several printings.

2. Method according to claim 1, wherein, prior to determining and storing the current printing progress rate, the second device authenticates successfully the first device or the first device authenticates successfully the second device.

3. Method according to claim 1, further comprising:
   initializing, by the first device or the second device, an interruption counter;
   storing, by the first device or the second device, a predetermined printing interruption threshold;
   responsive to determining that the printing of the three dimensional object is interrupted and a last current printing progress rate is less than the predetermined printing interruption threshold, changing, by the first device or the second device, the interruption counter and storing the changed interruption counter in association with the last current printing progress rate;
   comparing, by the first device or the second device, the changed interruption counter to the predetermined printing interruption threshold; and
   as soon as the changed interruption counter matches the predetermined printing interruption threshold, sending, by the first device or the second device, an alert message to a remote server.

4. Method according to claim 1, further comprising:
   sending, by a remote server, to the first device or the second device, a message including the predetermined printing threshold.

5. Method according to claim 4, wherein the predetermined printing threshold is included within metadata or data relating to a three dimensional printing file.

6. Method according to claim 1, further comprising:
   sending, by the first or the second device, to a remote server, a message including a last current printing progress rate.

7. Method according to claim 1, further comprising:
   sending, by a remote server, to the first or the second device, a message including a command for disallowing the first device to print any further three dimensional object.

8. Method according to claim 1, wherein, once the first or the second device has updated the predetermined data relating to one or several printings, sending, by the first or the second device, to a remote server, a message including signed updated predetermined data relating to one or several printings.

9. A printing device for printing a three dimensional object,
   wherein, the printing device, as a first device, comprises a memory configured to store predetermined data relating to one or several printings and a predetermined printing threshold, the predetermined printing threshold being less than a total completion of the printing of the three dimensional object, the first device is configured to:
   detect and store, during the printing of the three dimensional object, at least one current printing progress rate relating to the printing of the three dimensional object;
   compare the detected current printing progress rate to the predetermined printing threshold;

as soon as the detected current printing progress rate is greater than or equal to the predetermined printing threshold, change a counter relating to a printing number or modify a printing status to a predefined printing status value, to indicate that a printing right is consumed, said changing relating to the counter or said modifying relating to the printing status (i) validates the printing of the three dimensional object and (ii) updates the predetermined data relating to one or several printings.

10. A system for printing a three dimensional object, wherein, the system comprises:

a printing device, as a first device; and a secure element, as a second device, the second device being configured to cooperate with the first device, wherein the first device or the second device comprises a memory that stores predetermined data relating to one or several printings and a predetermined printing threshold, the predetermined printing threshold being less than a total completion of the printing of the three dimensional object, and wherein the first device or the second device is configured to:

detect and store, during the printing of the three dimensional object, at least one current printing progress rate relating to the printing of the three dimensional object;

compare the detected current printing progress rate to the predetermined printing threshold;

as soon as the current printing progress rate is greater than or equal to the predetermined printing threshold, change a counter relating to a printing number or modify a printing status to a predefined printing status value, to indicate that a printing right is consumed, said changing relating to the counter or said modifying relating to the printing status (i) validates the printing of the three dimensional object and (ii) updates the predetermined data relating to one or several printings.

* * * * *